(12) United States Patent
Schleichert et al.

(10) Patent No.: US 10,562,092 B2
(45) Date of Patent: Feb. 18, 2020

(54) TOOL FOR HOT STAMPING AND METHOD FOR MAKING THE TOOL

(71) Applicant: MAGNA INTERNATIONAL INC., Aurora, Ontario (CA)

(72) Inventors: Edward Schleichert, Munich (DE); Jason Wilson, Brampton (CA); Mark Fabischeck, Brampton (CA); Jim Metz, Troy, MI (US); Nick Adam, Brampton (CA)

(73) Assignee: MAGNA INTERNATIONAL INC., Aurora (CA)

( * ) Notice: Subject to any disclaimer, the term of this patent is extended or adjusted under 35 U.S.C. 154(b) by 160 days.

(21) Appl. No.: 15/102,861

(22) PCT Filed: Dec. 8, 2014

(86) PCT No.: PCT/CA2014/000877
§ 371 (c)(1),
(2) Date: Jun. 8, 2016

(87) PCT Pub. No.: WO2015/085399
PCT Pub. Date: Jun. 18, 2015

(65) Prior Publication Data
US 2016/0303637 A1    Oct. 20, 2016

(30) Foreign Application Priority Data

Dec. 9, 2013  (DE) .......... 10 2013 225 311
Jan. 9, 2014  (DE) .......... 10 2014 200 234

(51) Int. Cl.
*B21D 37/16* (2006.01)
*B21D 22/02* (2006.01)
*B21D 37/20* (2006.01)
*B22F 3/105* (2006.01)
*B22F 5/00* (2006.01)
*B33Y 10/00* (2015.01)
*B33Y 80/00* (2015.01)

(52) U.S. Cl.
CPC .......... *B21D 37/16* (2013.01); *B21D 22/022* (2013.01); *B21D 37/20* (2013.01); *B22F 3/105* (2013.01); *B22F 5/007* (2013.01); *B33Y 10/00* (2014.12); *B33Y 80/00* (2014.12)

(58) Field of Classification Search
CPC .... B21D 37/16; B21D 37/20; B29C 45/7312; B29C 2045/7318
See application file for complete search history.

(56) References Cited

U.S. PATENT DOCUMENTS

| | | | |
|---|---|---|---|
| 5,031,483 A * | 7/1991 | Weaver ............ | B21D 37/20 451/5 |
| 7,195,223 B2 | 3/2007 | Manuel et al. | |
| 8,108,982 B2 * | 2/2012 | Manuel ............ | B29C 33/04 164/348 |
| 9,701,075 B2 * | 7/2017 | Nemazi ............ | B21D 37/16 |

(Continued)

*Primary Examiner* — Debra M Sullivan
(74) *Attorney, Agent, or Firm* — Dickinson Wright PLLC

(57) ABSTRACT

A tool for hot stamping metal sheets, formed least partially of a base block and a functional layer, is proposed. The functional layer comprises cooling channels and multiple functional layers, which building upon each other create the connection to the base block. The cooling channels are designed as a cooling channel array and are produced in a laser sintering method.

23 Claims, 3 Drawing Sheets

(56) References Cited

U.S. PATENT DOCUMENTS

2006/0249872 A1\* 11/2006 Manuel ............. B22D 17/2218
                                                          264/225
2012/0247171 A1   10/2012 Horton et al.
2013/0125603 A1    5/2013 Liu et al.

\* cited by examiner

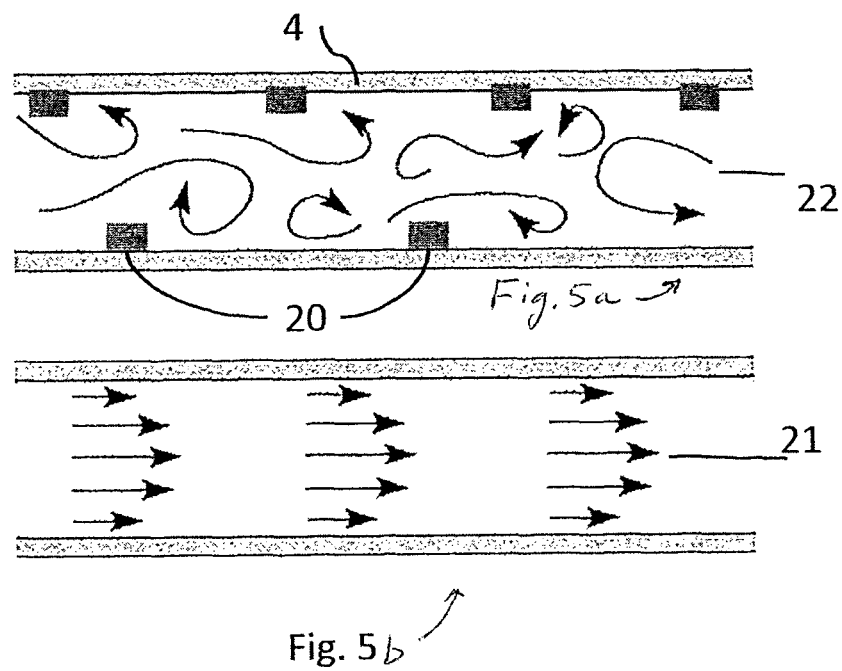
Fig. 5a
Fig. 5b
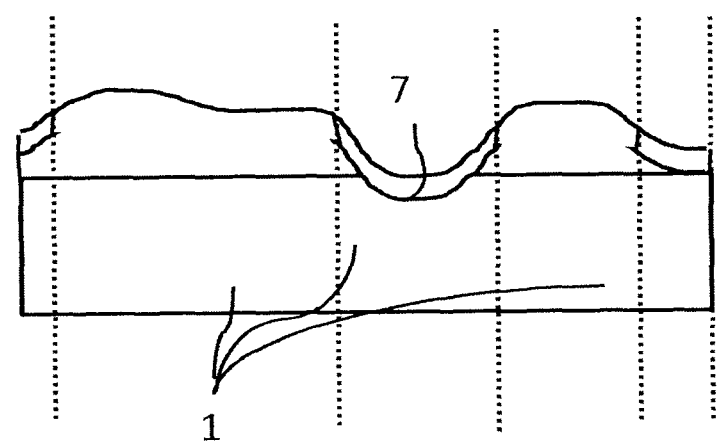
Fig. 6

_(US 10,562,092 B2)_

TOOL FOR HOT STAMPING AND METHOD FOR MAKING THE TOOL

CROSS-REFERENCE TO PRIOR APPLICATIONS

This U.S. National Stage Patent Application claims the benefit of PTC International Patent Application Ser. No. PCT/CA2014/000877 filed Dec. 8, 2014 entitled "Tool For Hot Stamping And Method For Making The Tool," which claims the benefit of DE Application Ser. No. 102013225311.7 filed Dec. 9, 2013 and DE Application Ser. NO. 102014200234.6 filed Jan. 9, 2014, the entire disclosures of the applications being considered part of the disclosure of this application and hereby incorporated by reference.

FIELD OF THE INVENTION

The invention relates to a tool for the hot stamping of metal sheets, the tool being formed of at least one base block having a functional layer, wherein the functional layer comprises cooling channels. The invention further relates to a method for making a tool for hot stamping.

BACKGROUND

Tool sections that are used in the hot stamping of metal sheets must be cooled, such as for instance by providing a cooling fluid through cooling channels that are formed within the tool sections. The cooling channels are in general conventionally machined, and typically they are drilled or milled during production of the tool. This production method limits homogeneous cooling when complex tool geometries are present.

It is known that thermal production methods are widely used in tool- and mould-making, due to ever shorter product development times and an increase in product variety for smaller lot sizes. For several years now metallic and non-metallic starting materials have been used, with the goal being to generate tools directly from computer assisted design (CAD) data. Such materials for tools, which are usually provided in powder form, are processed by laser-assisted methods. Laser generating and selective laser-sintering are two distinct examples of laser-assisted methods that are suitable for producing tools and moulds.

Laser generating can, in principle, be compared to a laser coating process, or also to laser build-up welding. In laser generating, the part to be produced is generated by partially or completely melting the starting material and successively adding individual sheets of coatings one on top of another. However, the level of accuracy that can be achieved using this method is too low to satisfy the requirements in regard to high-quality tools.

In selective laser-sintering, powder particles in a powder bed are partially melted or fused with the aid of a laser beam, and subsequently bind together to form a solid layer after cooling. Conventional selective laser-sintering systems include a laser, a beam-shaping and beam-guiding unit, a processor for software editing and processing, a unit for powder dosing, and a build platform. The laser beam is directed onto the build platform by way of a deflecting unit, for example a revolving mirror unit and an F-Theta lens. The processor unit controls the deflecting unit based on edited CAD data. The build platform carries the base on which the component is built up, and is designed to be leveling. Another option is to operate without the base, wherein the component is supported by the surrounding material. However, when using this method variant it must be ensured that the height of the build platform is adjustable. A likewise leveling powder reservoir and a wiper unit in the form of a blade or a roller are used to supply new material.

By repeating the process steps that are described below, a desired component can be generated, layer by layer. First, a desired powder layer thickness is applied, wherein a sufficient amount of powder for uniform coating should be available. The powder is applied across the entire surface of the build platform in a thickness of, for instance, 0.001 to 0.2 mm with the aid of a doctor blade or roller. The layers are incrementally sintered or fused into the powder bed by controlling the laser beam in accordance with the contour of the component. The build platform is then lowered slightly, and a new layer is applied. The powder is provided by raising a powder platform or as a supply in the doctor blade. The power density of the laser radiation that is used as the heat source is adjusted and supplied based on the powder system, in such a way that the developing temperature cycle partially fuses or melts a portion of the material, whereby the generated body is imparted structural strength.

To prevent oxidation of the melt, which adversely affects the sintering result, in particular in the case of metallic and ceramic starting materials, the selective laser sintering process is frequently carried out in the systems under inert gas or special metal gas atmospheres in a processing chamber.

A method for producing casting and pressing tools is known from US 2011/0229595 A1, which can be used to create free form heaters having appropriately arranged temperature control medium channels. With the aid of thermal spraying methods, a structure is created, which can comprise partially prefabricated temperature control channels. More particularly, thermal spraying is used to build a first insulating layer, and then either a lost mold or a prefabricated channel element is fixed to the first insulating layer. Additional insulating material is sprayed around the mold or channel element, and finally a machinable metal layer is applied. The process requires several steps to fabricate and position the lost mold or channel elements, to fix the lost mold or channel elements to the insulating layer, and to spray the various layers.

It would be beneficial to provide a method for making a tool that overcomes at least some of the above-mentioned disadvantages of the prior art.

SUMMARY OF EMBODIMENTS OF THE INVENTION

It is an object of at least one embodiment of the invention to create a tool of high precision and having temperature control channels, which can be produced in a simple manner based on CAD data, and which allows optimal adjustment of the cooling to the shape of the tool and the component to be produced.

According to an embodiment a tool for hot stamping of metal sheets is provided, the tool including: a base block and a functional layer, wherein the functional layer comprises cooling channels and includes multiple distinct layers, which building upon each other create the connection to the base block and which comprise cooling channels that are designed as cooling channel arrays and produced in a laser sintering method, wherein at least two of the cooling channels do not have an identical physical progression. The laser sintering method advantageously creates a cooling channel array that is very individually adapted to the design of the tool.

According to an embodiment a tool for hot stamping metal sheets is provided, the tool including: a base block fabricated from a first material and having a contour defined therein approximating a predetermined shape of a forming surface of the tool; and a functional layer formed within the contour of the base block, the functional layer defining a plurality of cooling channels, each cooling channel of the plurality of cooling channels being formed as a continuous void within the functional layer using a laser sintering process, at least two cooling channels of the plurality of cooling channels having different three-dimensional shapes one compared to the other, the functional layer including a plurality of functional sub-layers arranged one on top of another, and comprising at least: a first functional sub-layer for creating a connection to the first material of the base block; a second functional sub-layer containing the plurality of cooling channels; and a third functional sub-layer fabricated from tool-steel and providing the predetermined shape of a forming surface of the tool.

According to an embodiment a method for producing a hot stamping tool is provided, the method comprising: providing a base block within a powder bed of a laser sintering system, the base block having a contour defined therein, the contour approximating a predetermined shape of a forming surface of the tool; forming a functional layer within the contour by laser sintering successive layers of powdered material, comprising: forming a first functional sub-layer for creating a connection to the first material of the base block; forming a second functional sub-layer containing a plurality of cooling channels, each cooling channel being formed as a continuous void within the functional layer, and wherein at least two cooling channels of the plurality of cooling channels have different three-dimensional shapes compared to one another; and forming a third functional sub-layer fabricated from tool-steel and providing the predetermined shape of the forming surface of the tool.

In an embodiment at least some of the cooling channels have a different progression or three-dimensional shape compared to respective neighboring cooling channels. The term "progression" refers to the path that a cooling channel follows between its inlet end and its outlet end. As such, two channels are considered to have the same progression if one of the channels can be superimposed on the other. The progression of the different cooling channels may be determined, for instance, based on the known final shape of the forming surface of the tool. In this way, the progression of each cooling channel may be defined so as to provide a desired spacing between the cooling channel and the forming surface, for achieving an optimized cooling performance.

In an embodiment the cooling channels of the cooling channel array have differing cross-sections. For instance, the cross-sectional shape and/or size of at least one cooling channel differ from the cross-sectional shape and/or size of another cooling channel. As a result of the differing cross-sections, the cooling behavior of the cooling channel array is optimized at different locations of the tool.

In an embodiment the spacing between cooling channels of the cooling channel array varies. For instance, the spacing between two adjacent cooling channels varies along the lengths of the two cooling channels. Alternatively, a constant spacing is provided along the lengths of two adjacent cooling channels, but different adjacent cooling channels are spaced apart by different constant distances.

It is furthermore advantageous that the inlet and outlet of the cooling channels are connected in each case to a distributor line. As a result, only one inlet and one outlet is required to supply the tool, and the distributor line ensures the supply of cooling fluid to the individual channels.

In accordance with an embodiment the above-mentioned functional layer includes an adhesive layer, a cooling layer comprising the cooling channels, a structure layer, and a processing layer.

Due to the layered design, it is possible to use different materials during laser sintering and thus adapt the functional layers optimally to their tasks. It is important in particular in the cooling layer, which defines the cooling channels, that the fine structures can be produced by way of laser sintering using fine powder particles.

It is furthermore advantageous that at least one cooling channel includes at least one turbulence generator for causing turbulent flow in the temperature control fluid. By integrating turbulence generators, the flow of the coolant is transformed from laminar flow into turbulent flow, whereby improved cooling is achieved.

In advantageous embodiments, the turbulence generator is composed of structures in the wall of the at least one cooling channel, such as for instance elevations from the wall of the at least one cooling channel or blade-like structures.

By introducing turbulence generators of various designs, it is possible to influence the through-flow of the coolant and thus optimize cooling at the various points of the tool. It is advantageous for this purpose that the turbulence generator includes structures having undercuts. The laser sintering method is particularly suitable for producing undercuts.

It is advantageous to use a tool for hot stamping which is composed of one or more base blocks, wherein at least one of the base blocks, or at least one section of one base blocks, is configured with a functional layer produced by way of laser sintering methods. This has the advantage that the relatively expensive and complex laser sintering process is used only in the regions, or sections, of the tool in which it is necessary to form complex features and/or ensure accurate dimensions/shapes.

A method according to an embodiment of the invention uses laser sintering to apply a functional layer for producing a tool, the functional layer including a cooling layer defining cooling channels.

BRIEF DESCRIPTION OF THE DRAWINGS

The invention will be described by way of example, with reference to the accompanying drawings, in which:

FIG. 5a shows a longitudinal cross-section of a cooing channel including turbulence generators;

FIG. 5b shows a longitudinal cross-section of a cooling channel absent turbulence generators; and FIG. 6 shows a further embodiment in which a functional layer is formed within only a selected region of the tool.

DETAILED DESCRIPTION OF THE DRAWINGS

Figure 1:
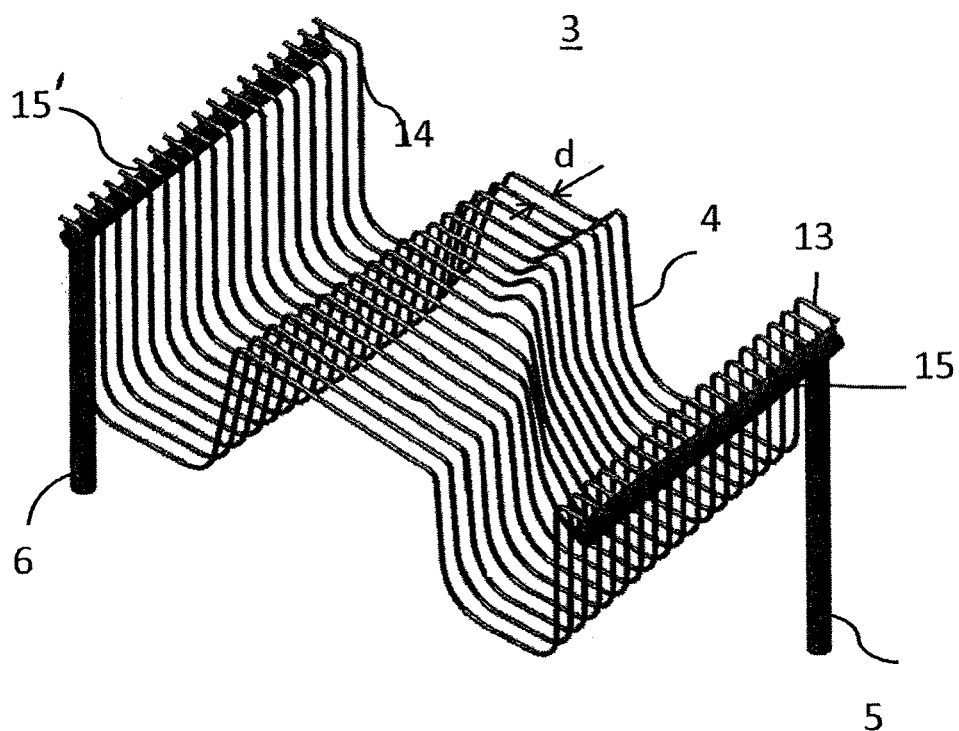
FIG. 1 shows a schematic illustration of an exemplary embodiment of the cooling channels in a CAD model.

FIG. 1 shows a schematic illustration of a plurality of cooling channels in a CAD model, which together form a so-called "cooling channel array" 3 for a hot stamping tool. The cooling channel array 3 is supplied from a feed line 5, which provides a coolant fluid for the cooling process via distributor 15. On the outlet side, the coolant fluid is collected by a second distributor 15', and discharged via a discharge line 6. The cooling channels 4 of the plurality of cooling channels are disposed between the two distributors 15, 15'. The inlet 13 of each cooling channel 4 is connected to the distributor of the feed line 5, and the outlet 14 is connected to the distributor of the discharge line 6. In this example, the coolant fluid flows through the cooling channels 4, which are disposed next to each other between the distributors 15 and 15', from right to left.

The cooling channels 4 are disposed at a distance "d" from each other. This distance d does not have to be constant for the entire cooling channel array. Since the cooling channel array 3 is designed so that it follows the structure of the tool, more specifically the shape of the not-illustrated forming surface of the tool, and must take into account the cooling requirements at different points of the tool, the physical configurations of the different cooling channels typically are different. In general, each cooling channel has a different three-dimensional shape. For instance, the progression of each cooling channel between the two distributors 15 and 15', as determined by the number of bends, the angle of each bend, the location of each bend, the number of straight sections, the length of each straight section and the location of each straight section, is different for each cooling channel of the cooling channel array. By additionally or alternatively varying the distance d between the cooling channels, it is possible to tailor different cooling properties at different locations of the tool.

Optionally, some cooling channels have substantially identical progressions and are merely offset one from another by the distance d. For instance, a tool for forming a symmetrically-shaped part may have substantially identical cooling structures on each side of a plane of symmetry.

Figure 2:
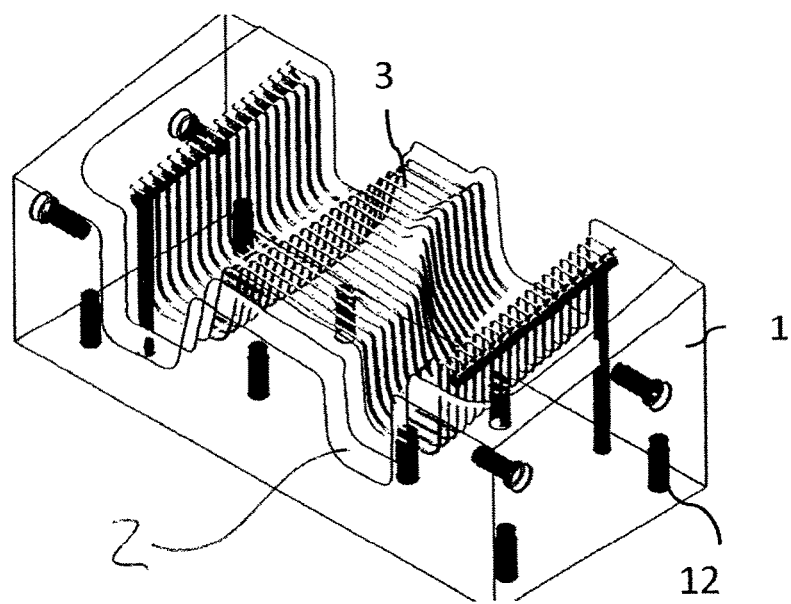
FIG. 2 shows an illustration of the composition and components of the tool.

FIG. 2 is a schematic illustration of a tool, in which the cooling channel array 3 of FIG. 1 has been formed by laser sintering. A base block 1 is used in the production of the tool. In this example the initial shape of the base block 1 is generally similar to the desired shape of the tool, including the rough contours of the tool forming surface. In accordance with an embodiment, the base block 1 is made of a lesser quality steel than is used for the final forming surface of the tool. The progression (or equivalently, the three-dimensional shape) of the cooling channels of the cooling channel array 3 is shown schematically disposed within the contour 2 of the base block 1. Moreover, tool attachments 12 are shown in FIG. 2.

By using laser sintering, the base block 1 is covered and coated with a functional layer 7, which is made of high-quality tool steel. As shown in the partial cross-sectional view of FIG. 3, there are multiple functional sub-layers within the functional layer 7. The functional layer 7 is up to 12 mm thick in the present example, but other applications may require the functional layer 7 to be thicker or thinner than 12 mm.

The first layer (adjacent to the base block 1) is an adhesive layer 8 measuring approximately 4 mm thick, which binds the material for laser sintering to the material of the base block 1. The next layer, the cooling layer 9, measuring approximately 3 mm thick, contains the cooling channels 4. The cooling channels 4 are produced in a structured fashion in the cooling layer 9 according to the specifications of the CAD model for the tool. Due to the use of the laser sintering method, no lost molds or additional channel components are required. In other words, the cavities for the cooling channels 4 of the cooling channel array 3 are produced directly in the powder material by melting only the particles outside the cavity. The powder particles remaining in the cooling channels 4 are removed at the end of the laser sintering process. As such, each cooling channel (4) of the plurality of cooling channels (or equivalently, each cooling channel (4) of the cooling channel array 3) is formed by laser sintering as a continuous void within the functional layer 7.

Figure 3:
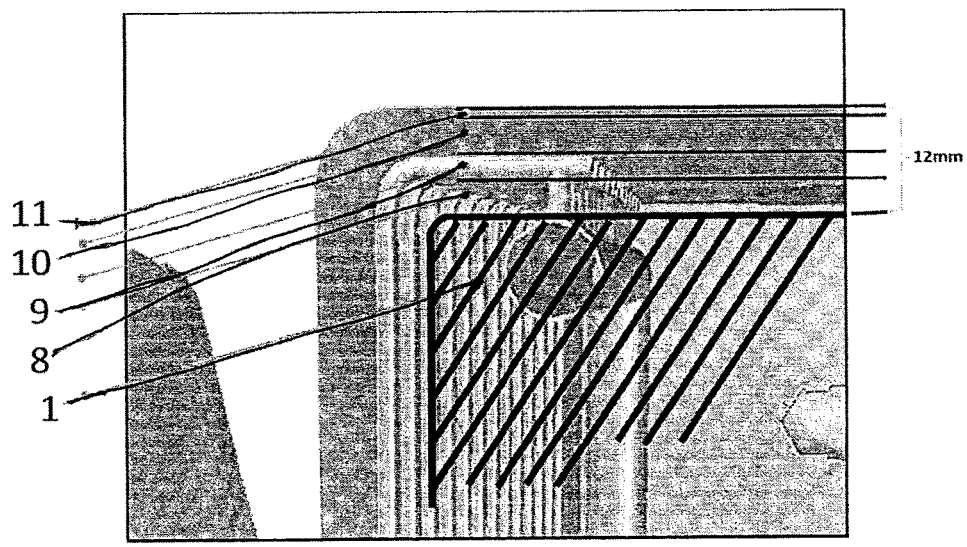
FIG. 3 shows a detail of the various layers that together form the functional layer of the tool of FIG. 2.

In the specific and non-limiting example that is shown in FIG. 3, the cooling channels 4 are produced with cross-sections that have a round shape. Optionally, the cooling channels 4 are oval or angular in cross-sectional shape. For some applications, and for given challenges in terms of cooling, it may be advantageous to combine cooling channels having differing cross-sectional shapes and/or sizes within the cooling channel array 3.

Referring still to FIG. 3, the next layer measuring 4 mm is the structure layer 10, which is important for producing a robust and strong production tool. The structure layer 10 offers optimal heat transfer, and ensures a long service life since it is made from tool-quality steel. The last layer measuring 1 to 2 mm is the processing layer, which is machined to provide the final contour of the forming surface of the tool.

Figure 4:
FIG. 4 shows a simplified sectional view through the composition of the tool.

FIG. 4 is a simplified cross sectional view, which illustrates the structure of the tool of FIG. 3. As is shown in FIG. 4, the cooling channel array 3 is formed as a series of continuous voids within the functional layer 7, which is built on the underlying base block 1. Advantageously, only a relatively small volume of the tool is produced using laser sintering; the base block 1 accounts for a substantial portion of the total volume of the tool. The base block 1 is fabricated using lower quality steel than is used in the functional layer 7, and may be fabricated using low precision manufacturing techniques, in order to minimize the overall cost of producing the tool. Alternatively, the base block may also be fabricated using a higher quality steel.

FIGS. 5a and 5b show detailed structure of different cooling channels 4. FIG. 5b is a longitudinal cross-sectional view through a channel 4 absent turbulence generators. Laminar flow 21 occurs within the cooling channel that does not include internal turbulence generators. Under conditions of laminar flow, the coolant flows evenly through the cooling channel 4 and a temperature gradient is formed between the side of the cooling channel in direct contact with the tool and the center of the cooling channel. In general, it is more desirable for the coolant to flow in a turbulent fashion. FIG. 5a shows a longitudinal cross-sectional view through a channel 4 that is equipped with internal turbulence generators 20. In FIG. 5a, the turbulence generators 20 are shown schematically as small blocks. In practice, the turbulence generators 20 can be either introduced into the wall of the cooling channel 4 as grooves or recesses, or they can protrude directly from the wall as a ridge, nose or elevation. In an embodiment, the turbulence generation is determined by blade-like elements, as they are known from turbine blades. Advantageously, even relatively complicated three-dimensional structures, including blades or wings, can be produced using laser sintering. Even undercuts pose no obstacle in integrating such complex structures as turbulence generators into the flow channel of the cooling channels 4. The examples shown here for the turbulence generators 20 can be supplemented by all possible components that increase turbulence. All combinations of different components are also conceivable for installation in the cooling channels.

During use, the incident flow of the coolant fluid on the turbulence generators 20 breaks up the laminar flow 21, thereby creating "swirls" 22. The swirls 22 transfer heat within the coolant fluid with much greater efficiency than laminar flow 21.

FIG. 6 shows a schematic illustration of another embodiment of the invention. As will be understood by a person having ordinary skill in the art, laser-sintering is a complex and cost-intensive technique. Extensive use of laser-sintering is therefore expected to push up the overall cost of making a tool. As shown in FIG. 6, it is advantageous to divide a tool into sub-regions, not all of which are provided with a functional layer 7 made of laser-sintered material. For this purpose, a base block 1 can be divided into different regions, as indicated in FIG. 6 using the dotted lines. A functional layer 7 is formed within some of the regions, but not within other of the regions. Optionally, conventional milling or drilling techniques are used to form cooling channels within the regions that do not receive a functional layer. Further optionally, the regions that do not receive a functional layer do not include any cooling channels.

Alternatively, a tool can be composed of multiple base blocks, which are connected to each other. In that case the dotted lines in FIG. 6 depict the joints between the multiple base blocks. The different base blocks can have different pre-treatments, so that the application of a functional layer 7 using laser sintering is not necessary for all base blocks.

REFERENCE NUMERALS 1 base block
2 contour of the base block
3 cooling channel array
4 cooling channels
d distance between adjacent cooling channels
5 feed line
6 discharge line
7 functional layer
8 adhesive layer
9 cooling layer
10 structure layer
11 processing layer
12 tool attachment
13 inlet of cooling channel
14 outlet of cooling channel
15, 15' distributors
20 turbulence generator
21 laminar flow
22 turbulent flow

The invention claimed is:

1. A tool for hot stamping comprising: a base block and a functional layer, the functional layer comprising cooling channels, wherein the functional layer includes multiple functional sub-layers, each sub-layer in a melted connection with adjacent sub-layers, which building upon each other create a connection to the base block and which one of the sub-layers surrounds the cooling channels that are designed as a cooling channel array and produced in a laser sintering method, wherein at least two of the cooling channels do not have the same three-dimensional progression, and wherein cooling channels of the cooling channel array have different cross-sections.

2. The tool for hot stamping according to claim 1, wherein each of the cooling channels has a different progression compared to the respective neighboring cooling channel.

3. A tool for hot stamping according to claim 1, wherein an inlet and an outlet of the cooling channels are connected in each case to a distributor line.

4. A tool for hot stamping according to claim 1, wherein the sub-layers include an adhesive layer, a cooling layer comprising the cooling channels, a structure layer, and a processing layer.

5. A tool for hot stamping according to claim 1, wherein at least one of the cooling channels includes at least one turbulence generator for inducing turbulent flow in a temperature control fluid.

6. A tool for hot stamping according to claim 5, wherein the at least one turbulence generator comprises structures in the wall of the at least one cooling channel.

7. A tool for hot stamping according to claim 5, wherein the at least one turbulence generator comprises elevations from the wall of the at least one cooling channel.

8. A tool for hot stamping according to claim 5, wherein the at least one turbulence generator comprises blades or wings.

9. A tool for hot stamping according to claim 5, wherein the at least one turbulence generator comprises structures having undercuts.

10. A tool for hot stamping according to claim 1, wherein the base block includes at least one section configured with the functional layer produced by way of the laser sintering method.

11. A method for producing a tool according to claim 1, comprising: forming the melted connection by the laser sintering of the functional layer to at least one region of the base block, and mechanically boring at least one of the regions of the base block which does not include the functional layer to define channels within the base block.

12. A tool for hot stamping comprising:
a base block fabricated from a first material and having a contour defined therein approximating a predetermined shape of a forming surface of the tool; and
a functional layer formed within the contour of the base block, the functional layer defining a plurality of cooling channels, each cooling channel of the plurality of cooling channels being formed as a continuous void within the functional layer using a laser sintering process, at least two cooling channels of the plurality of cooling channels having different three-dimensional shapes one compared to the other, the functional layer including a plurality of functional sub-layers arranged one on top of another, and comprising at least:
a first functional sub-layer for creating a connection to the first material of the base block;
a second functional sub-layer containing the plurality of cooling channels; and
a third functional sub-layer fabricated from tool-steel and providing the predetermined shape of a forming surface of the tool,
wherein the cross-sectional shape of at least one cooling channel of the plurality of cooling channels is different than the cross-sectional shape of another cooling channel of the plurality of cooling channels.

13. A tool for hot stamping according to claim 12, wherein the plurality of cooling channels is disposed between a first distributor and a second distributor, an inlet of each cooling channel of the plurality of cooling channels being in fluid communication with the first distributor, and an outlet of each cooling channel of the plurality of cooling channels being in fluid communication with the second distributor.

14. A tool for hot stamping according to claim 12, comprising a fourth functional sub-layer disposed between the second functional sub-layer and the third functional sub-layer, the fourth functional sub-layer being a structure layer fabricated from tool-steel.

15. A tool for hot stamping according to claim 12, wherein each cooling channel has a different three-dimensional shape compared to the three-dimensional shape of each respective neighboring cooling channel.

16. A tool for hot stamping according to claim 12, comprising at least one turbulence generator disposed within at least one cooling channel of the plurality of cooling channels.

17. A tool for hot stamping according to claim 16, wherein the at least one turbulence generator comprises structures defined along an inner wall surface of the at least one cooling channel.

18. A tool for hot stamping according to claim 17, wherein the at least one turbulence generator comprises elevations projecting from the inner wall surface of the at least one cooling channel.

19. A tool for hot stamping according to claim 17, wherein the at least one turbulence generator comprises blades or wings.

20. A tool for hot stamping according to claim 17, wherein the at least one turbulence generator comprises structures having undercuts.

21. A tool for hot stamping comprising:
a base block fabricated from a first material and having a contour defined therein approximating a predetermined shape of a forming surface of the tool; and
a functional layer formed within the contour of the base block, the functional layer defining a plurality of cooling channels, each cooling channel of the plurality of cooling channels being formed as a continuous void within the functional layer using a laser sintering process, at least two cooling channels of the plurality of cooling channels having different three-dimensional shapes one compared to the other, the functional layer including a plurality of functional sub-layers arranged one on top of another, and comprising at least:
a first functional sub-layer for creating a connection to the first material of the base block;
a second functional sub-layer containing the plurality of cooling channels; and
a third functional sub-layer fabricated from tool-steel and providing the predetermined shape of a forming surface of the tool,
wherein the cross-sectional size of at least one cooling channel of the plurality of cooling channels is different than the cross-sectional size of another cooling channel of the plurality of cooling channels.

22. A tool for hot stamping comprising:
a base block fabricated from a first material and having a contour defined therein approximating a predetermined shape of a forming surface of the tool; and
a functional layer formed within the contour of the base block, the functional layer defining a plurality of cooling channels, each cooling channel of the plurality of cooling channels being formed as a continuous void within the functional layer using a laser sintering process, at least two cooling channels of the plurality of cooling channels having different three-dimensional shapes one compared to the other, the functional layer including a plurality of functional sub-layers arranged one on top of another, and comprising at least:
a first functional sub-layer for creating a connection to the first material of the base block;
a second functional sub-layer containing the plurality of cooling channels; and
a third functional sub-layer fabricated from tool-steel and providing the predetermined shape of a forming surface of the tool,
wherein at least one of the cross-sectional shape and the cross-sectional size of at least one cooling channel of the plurality of cooling channels varies along a length of said at least one cooling channel.

23. A method for producing a hot stamping tool, comprising:
providing a base block within a powder bed of a laser sintering system, the base block having a contour defined therein, the contour approximating a predetermined shape of a forming surface of the tool;
forming a functional layer within the contour by laser sintering successive layers of powered material, comprising:
forming a first functional sub-layer for creating a connection to the first material of the base block;
forming a second functional sub-layer containing a plurality of cooling channels, each cooling channel being formed as a continuous void within the functional layer, and wherein at least two cooling channels of the plurality of cooling channels have different three-dimensional shapes compared to one another; and
forming a third functional sub-layer fabricated from tool-steel and providing the predetermined shape of the forming surface of the tool.

* * * * *